June 29, 1937.   A. G. HOTCHKISS   2,085,586
APPARATUS FOR PRODUCING A GAS ATMOSPHERE
Filed July 30, 1935
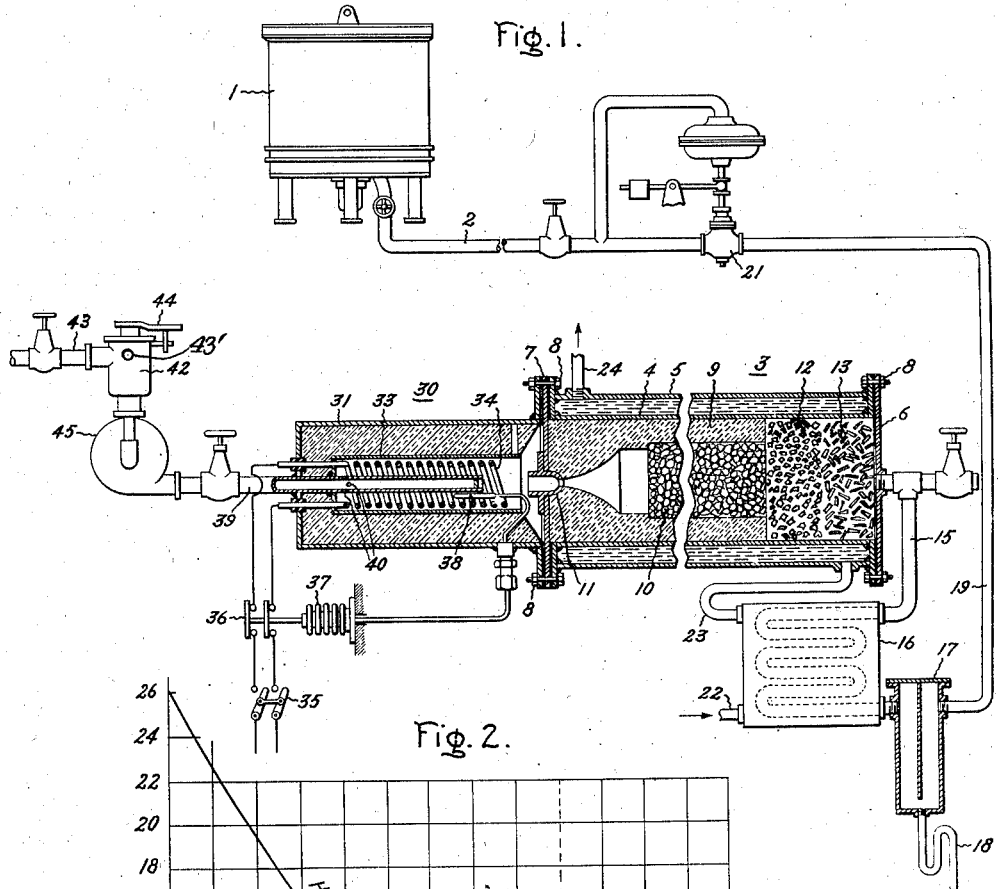
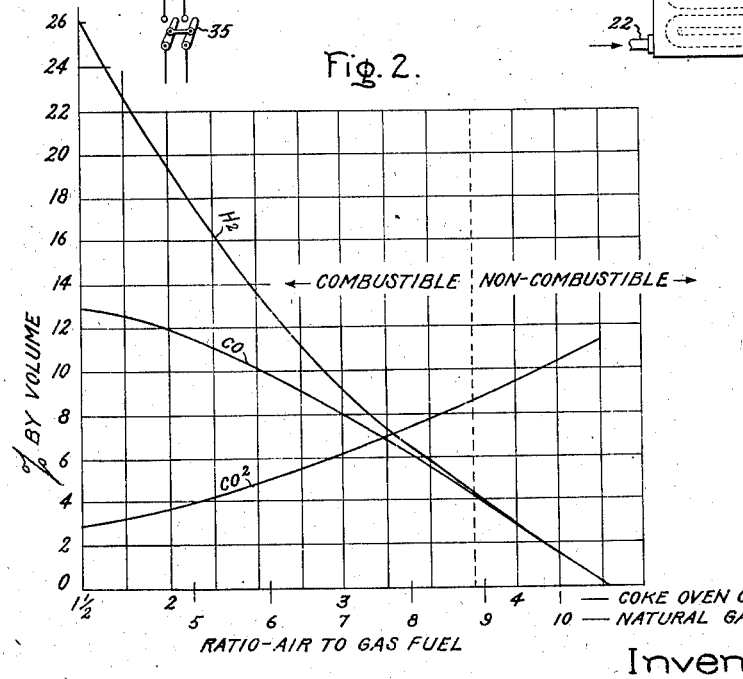
Inventor:
Allen G. Hotchkiss,
by Harry E. Dunham
His Attorney.

Patented June 29, 1937

2,085,586

UNITED STATES PATENT OFFICE 2,085,586

APPARATUS FOR PRODUCING A GAS ATMOSPHERE

Allen G. Hotchkiss, Schenectady, N. Y., assignor to General Electric Company, a corporation of New York Application July 30, 1935, Serial No. 33,917

2 Claims. (Cl. 23—281)

My invention relates to apparatus for producing a gas which is adapted for use as the surrounding atmosphere for metallic articles or material undergoing various heat treating operations, such, for example, as brazing, annealing, etc., where it is essential that the metal being treated shall be surrounded by a non-oxidizing or by a reducing atmosphere.

Certain forms of apparatus have been employed in the past for the production of a gas suitable for such an atmosphere by burning a mixture of air and natural or artificial gaseous fuel in a combustion chamber, the process being a continuous one and the chamber being maintained at the proper temperature by the combustion of the fuel. With such apparatus difficulty has been experienced in maintaining the combustion chamber at the required temperature for the desired combination of the fuel and air when the demand for the gas atmosphere is relatively small and when a non-oxidizing and particularly when a reducing gas atmosphere is required, since the heat produced in the chamber is dependent upon the rate at which fuel is burned therein. Moreover with such apparatus difficulty has been experienced in obtaining a gas which could be successfully used when a non-oxidizing atmosphere is required even when the apparatus has been operated with the lowest possible ratio of air to fuel which would still maintain the chamber at the required temperature, and it has been particularly difficult, if not impossible, to obtain a gas under those circumstances which had sufficient reducing qualitiees for certain kinds of work such as copper brazing processes involving parts composed of high carbon steel.

It is the object of my invention to provide an improved apparatus of this character for the production of a gas atmosphere which shall overcome the difficulties mentioned above and which shall be simple in construction, efficient and reliable in operation and inexpensive to manufacture.

Referring to the drawing, Fig. 1 represents apparatus shown partly in section comprising one embodiment of my invention, and Fig. 2 shows several curves to illustrate the changes which may take place within the apparatus.

While the gas atmosphere produced by the apparatus involving my invention may be used for a variety of purposes, I have chosen to illustrate it as connected to supply a gas atmosphere to the well known bell-type furnace 1, which, for example, may be employed for copper brazing of steel parts or for annealing sheet steel where the heat treatment must be carried on in the presence of a non-oxidizing or a reducing atmosphere.

The gas for the atmosphere is supplied to the furnace by the pipe 2 from the combustion chamber designated as a whole by 3. In this chamber a low ratio mixture of air and gas fuel is burned and purified to provide the atmosphere having the desired characteristics for the furnace 1. The combustion chamber 3 comprises the cylindrical casing 4 surrounded by the outer casing 5 forming a water jacket and the end heads 6 and 7 which are suitably secured, as for example by bolts 8, to flanges welded to the casings 4 and 5. The inner casing 4 has the lining 9 of refractory material such as fire brick which extends from the forward end of the casing to a point near the rear end thereof and which encloses a mass 10 of broken pieces of fire brick treated with a suitable catalyst, such as nickel. At the entrance end of the combustion chamber is the burner 11 through which the mixture of gas fuel and air is admitted to the combustion chamber. In the latter portion of the chamber is the gas purifying means comprising a mass of iron particles 12, and beyond that is a mass of copper particles or shavings 13. This means removes traces of oxygen that may be left in the gas but its greatest importance is in the breaking down and collecting of sulphur compounds from the gas such as carbon bisulphide which otherwise would pass through the combustion chamber and into the furnace. By arranging the purifying means 12 and 13 within the casing 4 closely adjacent the mass 10 it is subjected to the full heat of the gas whereby it functions in the most efficient manner. By this arrangement also the purifying material is easily accessible by the removal of the end head 6 whenever it is necessary to replenish the supply thereof.

The gas produced in the combustion chamber is withdrawn through the pipe connection 15, connected with which there is shown a valve by means of which the mixture in the combustion chamber may be ignited, and is passed through the water cooler 16 where its temperature is reduced to the point where a certain amount of moisture is condensed out. From the cooler 16 the gas passes through the separator 17 in which the condensed moisture is separated and escapes through the trap 18. The cooled and dehydrated gas then passes through the pipe 19 to the pipe 2 leading into the furnace, the pressure of the gas being suitably reduced by the reducing valve 21 of well known form. The cooler 16 is shown having a connection 22 by which cooling water is admitted thereto, and a second connection 23 by which water passes therefrom into the water jacket 5 of the combustion chamber from which the water escapes through the pipe 24.

An important feature of my invention is that I preheat the mixture of air and gas fuel as the same is admitted to the combustion chamber. Such preheating of the mixture as it is admitted to the combustion chamber may be accomplished in various ways but I prefer to do the heating electrically. For this purpose I have provided the preheating chamber represented as a whole by 30, which comprises the outer casing 31 having a flange at one end which is secured, for example, by the bolts 8 to the end head 7 and to the adjacent flange on the combustion chamber. This casing 30 has a suitable lining of heat insulating material within which is the inner casing 33 forming a central chamber where heating of the gas mixture takes place. Heat is supplied by the heating unit 34 which may, for example, be in the form of a coil or helix as shown and comprise a resistance wire arranged within a sheath from which it is suitably insulated, such as described and claimed in United States Patent No. 1,367,341 to Abbott, dated February 1, 1921, the unit being connected through the switch 35 with a suitable source of current supply. In circuit also with the heating unit is the thermostat control switch 36 operated by the expansible bellows 37 which by a connection with bulb 38 in the heating chamber responds to the temperature in the preheating chamber, the bellows and bulb containing an expansible fluid. The gas mixture is admitted to the preheating chamber through the pipe 39 which has suitable openings 40 at the forward end of the preheater but is closed at the rear end whereby the fuel mixture in escaping from the pipe 39 through the openings 40 is caused to pass in more intimate contact with the heating unit toward the burner 11. By means of this preheater the air and fuel mixture is preferably heated to approximately 500–600 degrees F. before it enters the combustion chamber and by connecting the preheating chamber directly to the burner end of the combustion chamber there results a minimum loss of heat as well as a more compact arrangement. By means of the temperature responsive apparatus I am able to heat the mixture and maintain it at any desired temperature before it is admitted to the combustion chamber.

Various means may be employed for mixing the air and fuel and for supplying it at the proper pressure to the preheater. In the drawing I have illustrated such a means as comprising the mixing valve 42 of well known form having the fuel intake 43 and having an air inlet opening, shown at 43', controlled by the handle 44, whereby any desired ratio of air to gas fuel may be obtained. Between the mixing valve 42 and the preheater is shown the centrifugal pump 45 by which the mixture is supplied to the preheater at the desired pressure.

It will be understood that while I have shown the combustion chamber 3 as provided with a water jacket, the jacket may be omitted in cases where the loss of heat from the combustion chamber is not objectionable.

As mentioned above, when the mixture of fuel and air is admitted directly as heretofore to the combustion chamber, there has been difficulty in maintaining a sufficiently high temperature therein to produce a gas suitable for a non-oxidizing or reducing atmosphere when the demand was small, and there has also been difficulty in obtaining a gas which was sufficiently reducing in character even when the chamber has been supplied with a mixture of air and fuel of the lowest possible ratio which would maintain the chamber at the required temperature. With the apparatus which I have devised and described above whereby the fuel and air mixture is preheated before it is admitted to the combustion chamber, I am able to avoid those difficulties. Furthermore, I am able to effect an important economy in the production of gas for the atmosphere.

With the previous apparatus the flame speed within the combustion chamber has been so slow that the point at which combustion began often would move some distance away from the burner end of the chamber allowing that end of the chamber to become relatively cool. By preheating the mixture supplied to the chamber the flame speed is increased sufficiently to cause the mixture to burn at the burner tip rather than at some intermediate point thereby keeping the combustion chamber hot for its entire length. Also by preheating the mixture the temperature of the combustion chamber is increased whereby a more complete burning of the fuel takes place with less tendency to deposit free carbon. The higher temperature in the combustion chamber, moreover, promotes the action of the catalyst impregnated brick therein which increases the amount of carbon monoxide formed and decreases the amount of free carbon deposit.

Another advantage of the construction which I have devised whereby the mixture supplied to the combustion chamber is preheated lies in the fact that a lower ratio of air to fuel may be used and still maintain the proper temperature in the combustion chamber. Operation of the apparatus at the lower ratio means that less air is introduced, hence a smaller proportion of the fuel admitted is burned which results in the production of an atmosphere that is higher in its hydrogen and carbon monoxide content and lower in its carbon dioxide content. Because of the greater amount of reducing gas therein the atmosphere is more suitable for use in certain types of copper brazing and also for the reduction of oxide in the process of annealing sheet steel. The resulting atmosphere also has less tendency toward decarburization due to the increase of the carbon monoxide and the decrease of the carbon dioxide content.

Though the demand for the gas atmosphere might be relatively small, with apparatus as heretofore constructed a considerable quantity of fuel had to be burned when the ratio of air to fuel was the lowest possible, for example, 2:1, in order to maintain the required operating temperature in the combustion chamber, the surplus in that case being allowed to escape. With the apparatus which I have devised whereby the mixture is preheated before being admitted to the combustion chamber the minimum output at that same low ratio can be reduced approximately 25%. This makes for a more flexible apparatus and allows it to cover a greater range of outputs. Moreover, it avoids the wasting of gas when the demand therefor is below the volume required to maintain the combustion chamber at the proper operating temperature.

In Fig. 2 I have shown how the amount of hydrogen, carbon monoxide and carbon dioxide in the atmosphere produced by the apparatus measured in per cent by volume varies with changes in the ratio of air to gas fuel, ratios being given for both coke oven gas and natural gas. From these curves it will be seen that as the ratio of air to gas fuel increases the per cent of hydrogen and of carbon monoxide both decrease while the per cent of carbon dioxide increases.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Apparatus for producing a gas whose composition is relatively high in non-oxidizing elements and low in oxidizing elements by the burning of a mixture of a hydrocarbon gaseous fuel with a deficiency of air comprising a metal casing having end heads and a refractory lining forming a combustion chamber, means secured to one of said end heads for withdrawing the burned mixture, a nozzle secured to the other end head and communicating with said chamber, a second metal casing secured to said other end head and having a heat insulating lining forming a preheating chamber connected directly with said nozzle, an electric heating element arranged within said preheating chamber and a mass of purifying material within said first mentioned casing and adjacent to said one end head.

2. Apparatus for producing a gas whose composition is relatively high in non-oxidizing elements and low in oxidizing elements by the burning of a mixture of a hydrocarbon gaseous fuel with a deficiency of air comprising a metal casing having a refractory lining forming a combustion chamber, a removable end head at one end of said casing, means secured thereto for withdrawing the burned mixture from the casing, a second end head at the opposite end of the casing, a nozzle secured thereto and communicating with the chamber, a second metal casing secured to said second end head and having a heat insulating lining forming a preheating chamber, a resistance heater in said preheating chamber, means therein for causing the mixture to pass over said heater, and means for purifying the burned mixture before it leaves said first casing comprising a mass of cast iron particles followed by a mass of copper particles arranged within said first casing and retained by said removable end head.

ALLEN G. HOTCHKISS.